(12) United States Patent
O'Banion

(10) Patent No.: US 6,829,830 B2
(45) Date of Patent: Dec. 14, 2004

(54) CUT GUIDE FOR PORTABLE SAW

(75) Inventor: Michael L. O'Banion, Westminster, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/630,030

(22) Filed: Jul. 30, 2003

(65) Prior Publication Data

US 2004/0020061 A1 Feb. 5, 2004

Related U.S. Application Data

(60) Provisional application No. 60/400,955, filed on Aug. 2, 2002.

(51) Int. Cl.$^7$ .............................................. B23D 53/00
(52) U.S. Cl. ............................. 30/371; 30/380; 83/574; 83/745
(58) Field of Search ......................... 30/380, 371, 372, 30/122; 83/745, 574

(56) References Cited

U.S. PATENT DOCUMENTS

| | | | |
|---|---|---|---|
| 1,868,739 A | * | 7/1932 | Everett .......................... 83/795 |
| 2,568,791 A | | 9/1951 | Cooper |
| 2,823,709 A | * | 2/1958 | Konieczka .................... 83/745 |
| 2,973,576 A | | 3/1961 | Hentke |
| 3,834,019 A | | 9/1974 | Smeltzer et al. |
| 3,858,317 A | | 1/1975 | Ford et al. |
| 4,258,600 A | * | 3/1981 | Jackson ......................... 83/574 |
| 4,266,457 A | * | 5/1981 | Balch et al. ................... 83/745 |
| 4,332,084 A | * | 6/1982 | Lovas et al. ................... 30/380 |
| 4,841,639 A | * | 6/1989 | Graney .......................... 30/380 |
| 4,854,206 A | * | 8/1989 | Wilfong ........................ 83/745 |
| 5,009,007 A | * | 4/1991 | Martin et al. .................. 30/92 |
| 5,179,886 A | * | 1/1993 | Rathje, Jr. .................. 83/471.3 |
| 5,185,928 A | * | 2/1993 | Martin et al. ................. 30/92.5 |
| 5,611,146 A | | 3/1997 | Ducret |
| 5,806,187 A | | 9/1998 | Ducret |
| 6,067,716 A | | 5/2000 | Carter |
| 6,256,891 B1 | | 7/2001 | Van Camp et al. |

OTHER PUBLICATIONS

Milwaukee Electric Tools/Super Sawzall® Accessories/Pipe Clamp System 49–22–1012.

* cited by examiner

Primary Examiner—Douglas D Watts
(74) Attorney, Agent, or Firm—Harness, Dickey & Pierce, P.L.C.

(57) ABSTRACT

A cut guide for a portable hand-held saw that has a blade with a cutting portion that is disposed along a generally vertical axis. The cut guide includes a mounting portion, which is configured to be coupled to the saw, a guide block portion, a guide portion and an adjustment mechanism. The guide block portion, which defines a generally vertical cutting stroke axis, is pivotally coupled to the mounting portion such that the cutting stroke axis can be pivoted relative to the cutting portion of the blade. The guide portion is movably coupled to the guide block portion along the cutting stroke axis. The guide portion includes an abutment structure with at least one feature for establishing an orientation of the cutting stroke axis relative to a longitudinal axis of a workpiece. The adjustment mechanism pivots the guide block portion relative to the mounting portion to thereby adjust an angular relationship of the cutting stroke axis relative to the longitudinal axis of the workpiece.

20 Claims, 6 Drawing Sheets

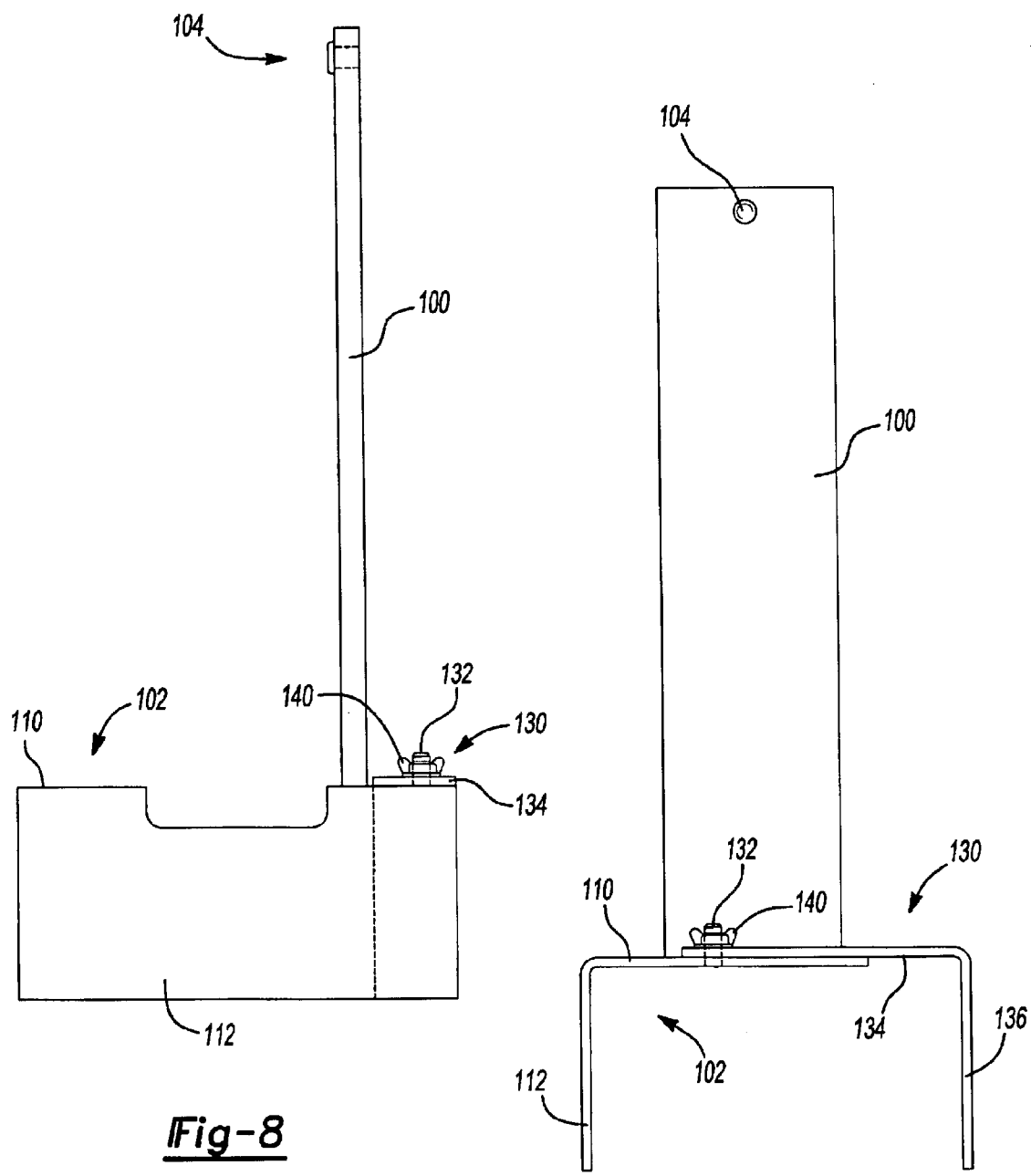

CUT GUIDE FOR PORTABLE SAW

CROSS-REFERENCE TO RELATED APPLICATIONS

This application claims the benefit of U.S. Provisional Application Ser. No. 60/400,955 filed Aug. 2, 2002 entitled "Cut Guide for Portable Saw".

FIELD OF THE INVENTION

The present invention generally relates to portable hand-held power saws and more particularly to a cut guide for a portable hand-held power saw that permits the operator to easily and efficiently adjust the plumbness of the cut.

BACKGROUND OF THE INVENTION

Many tradespersons, such as pipe fitters, steam fitters and electricians, routinely cut metal workpieces such as pipes, tubes and conduit with portable hand-held power saws. In some applications, such as when the end of a pipe or conduit is to be threaded, it is highly desirable that the cut be perpendicular to the axis of the workpiece so that the maximum axial deviation or runout of the cut is less than about one-thirty second of an inch. When this degree of accuracy is needed, the tradesperson was typically forced to employ a free-standing cutoff saw or a portable hand-held band saw. Free-standing cutoff saws, however, are not typically practical due to issues with their cost and size, as well as the free-standing (i.e., non-portable) nature of the saw.

Although portable hand-held band saws provided the tradesperson with an efficient yet portable means for cutting workpieces, these tools do not typically provide a desired level of accuracy in the plumbness of the cut, due to variables such as the squareness with which the tradesperson holds the tool relative to the workpiece and, more significantly, the set, sharpness and symmetry of the teeth of the saw blade. As those skilled in the art will appreciate, variances in the set, sharpness and symmetry of the teeth of the opposite sides of a band saw blade will cause the band saw blade to cut more heavily on one side or the other so that the path of the saw blade curves or wanders to one side. Furthermore, the sharpness and set of a given blade will vary asymmetrically as the band saw blade wears.

In view of the foregoing, a tradesperson typically employs a "wrap-around gauge" to mark the location of the cut around the full circumference of the workpiece when portable hand-held band saws are used. A wrap-around gauge is a flexible strip of material, usually cardboard, having a straight edge. The straight edge of the gauge is aligned to the desired location of the cut and thereafter wrapped around the circumference of the workpiece such that the straight edge is aligned to itself along its full length. The tradesperson then marks the location of the cut with a marker or pencil, using the straight edge of the guide as a reference. With the location of the cut thus marked, the tradesperson uses the portable hand-held band saw to partially cut through the workpiece. The workpiece is next rotated through a desired angle, such as about 90° to about 180° and the portable hand-held band saw is employed to cut through a second portion of the workpiece. The steps of rotating the workpiece and at least partially cutting through the workpiece are repeated until the cut through the workpiece has been completed. Needless to say, this method is not desirable, since it is relatively inefficient and cumbersome, and does not guarantee the desired level of accuracy.

Accordingly, there remains a need in the art for an improved cut guide that can be used in conjunction with a portable hand-held band saw.

SUMMARY OF THE INVENTION

In one preferred form, the present invention provides a cut guide for a portable hand-held saw that has a blade with a cutting portion that is disposed along a generally vertical axis. The cut guide includes a mounting portion, which is configured to be coupled to the saw, a guide block portion, a guide portion and an adjustment mechanism. The guide block portion, which defines a generally vertical cutting stroke axis, is pivotally coupled to the mounting portion such that the cutting stroke axis can be pivoted relative to the cutting portion of the blade. The guide portion is movably coupled to the guide block portion along the cutting stroke axis. The guide portion includes an abutment structure with at least one feature for establishing an orientation of the cutting stroke axis relative to a longitudinal axis of a workpiece. The adjustment mechanism pivots the guide block portion relative to the mounting portion to thereby adjust an angular relationship of the cutting stroke axis relative to the longitudinal axis of the workpiece.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 8 is a rear side elevation view of a portion of the cut guide illustrating the guide portion with an optional front clamp;

FIG. 9 is a right side elevation view of the guide portion;

DETAILED DESCRIPTION OF THE PREFERRED EMBODIMENTS

Figure 1:
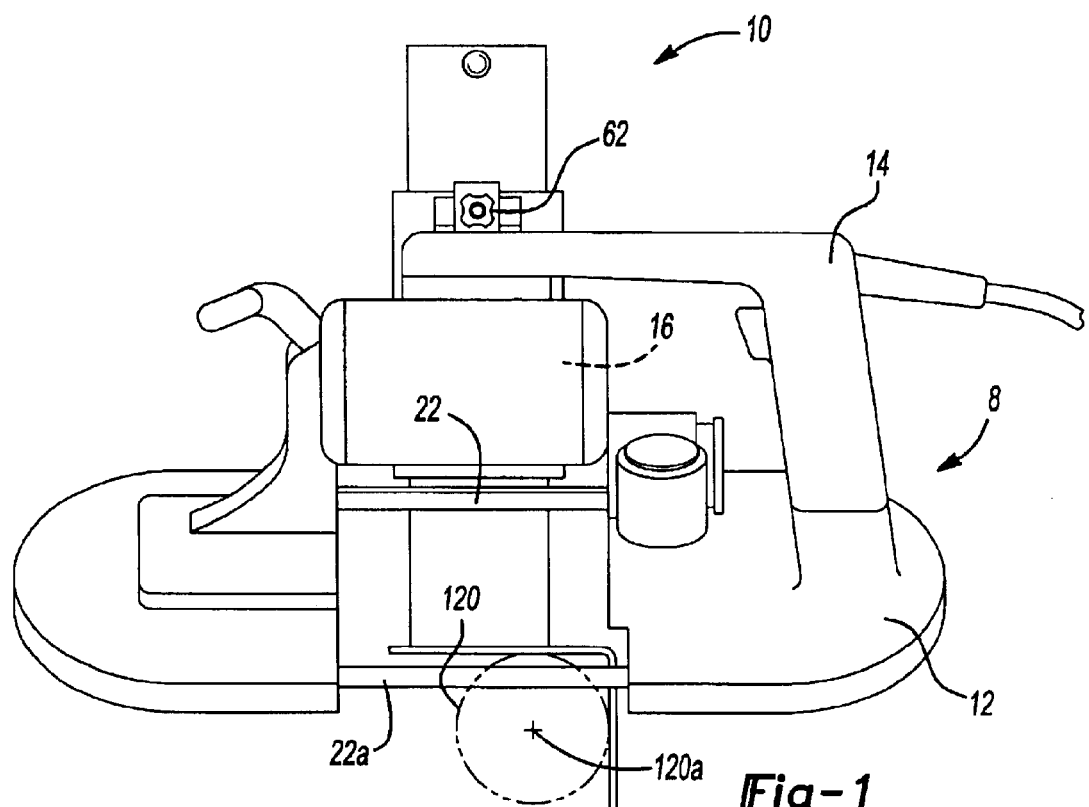
FIG. 1 is a left side elevation view of a cut guide constructed in accordance with the teachings of the present invention in operative association with a portable hand-held band saw.
Figure 2:
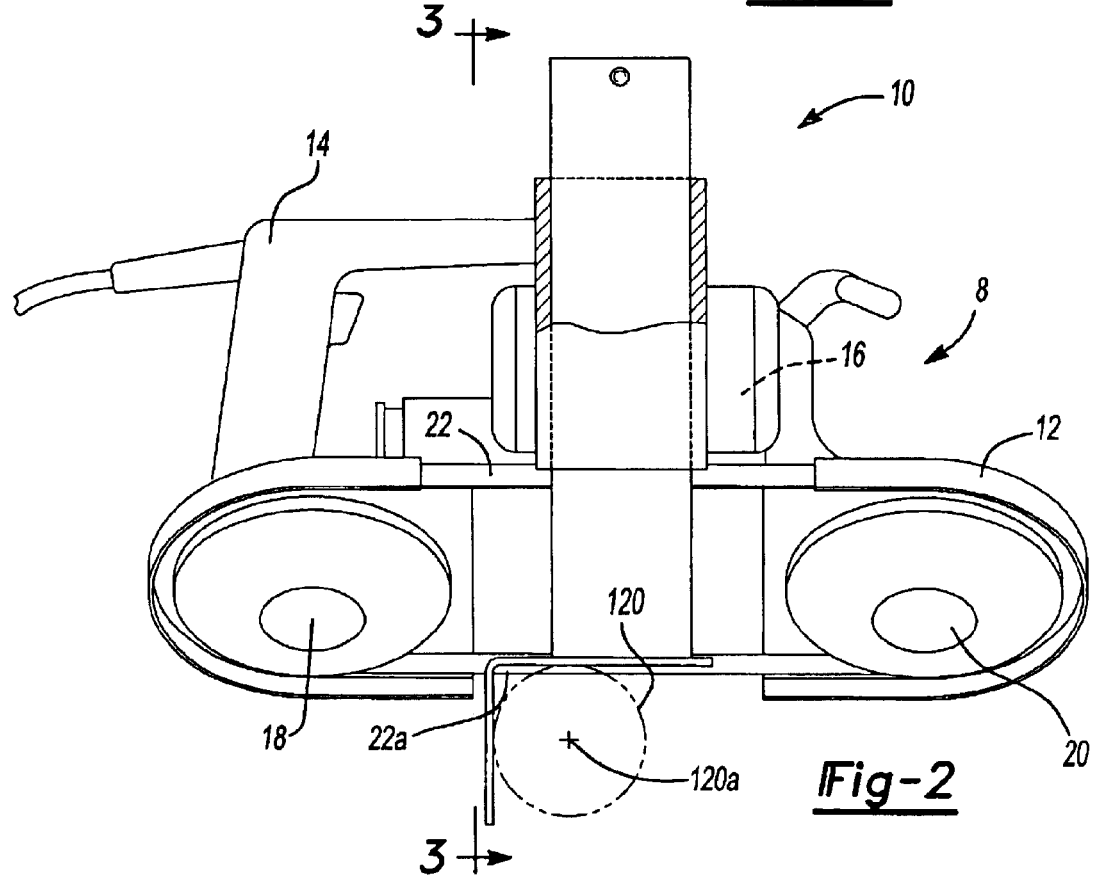
FIG. 2 is a right side view of the cut guide and band saw of FIG. 1.

With reference to FIGS. 1 and 2 of the drawings, a commercially available portable hand-held band saw 8 is shown in conjunction with a cut guide 10 that is constructed in accordance with the teachings of the present invention. The band saw 8 is conventional in its construction and operation and as such, need not be discussed in significant detail herein. Briefly, the band saw 8 includes a housing 12 that defines a handle 14 and which houses an electric motor 16. The motor 16 is employed to rotate a drive spindle 18. A driven spindle 20 is rotatably coupled to the housing 12. A conventional band saw blade 22 is wrapped around the perimeter of (and supported by) the drive and driven spindles 18 and 20 such that rotary power transmitted by the drive spindle 18 is employed to rotate the band saw blade 22 within the housing 12.

Conventionally, the band saw blade 22 includes a plurality of saw teeth (not specifically shown) having a set. As is apparent from the above discussion, a cut made by the band saw blade 22 will not necessarily lie in a plane that is generally parallel the cutting portion 22a of the band saw blade 22.

Figure 3:
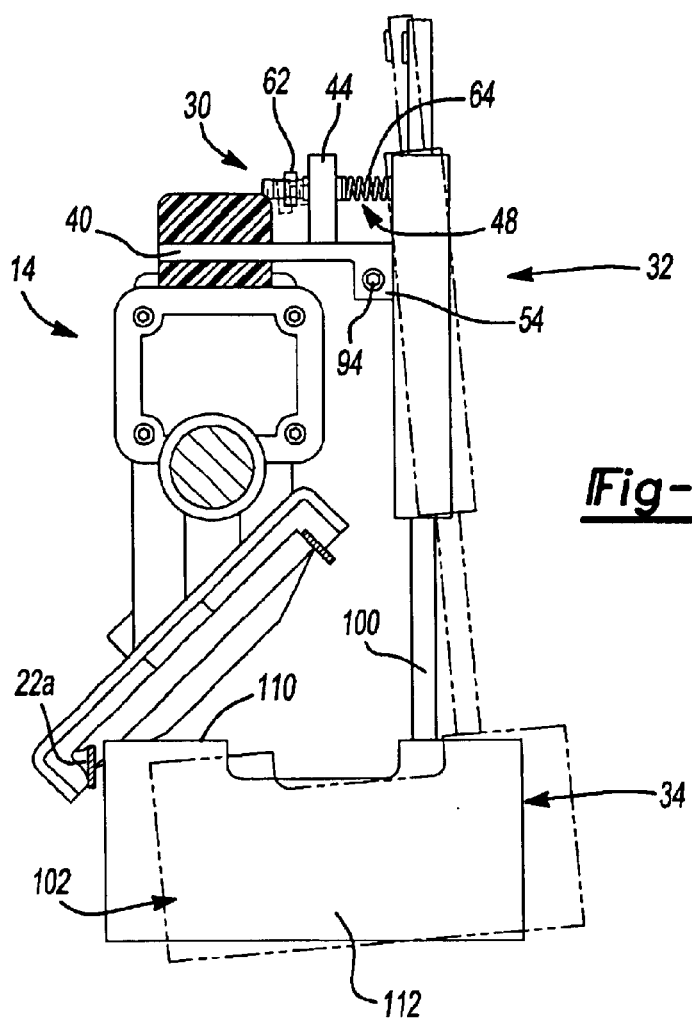
FIG. 3 is a rear elevation view of the cut guide with the band saw being shown in section.
Figure 4:
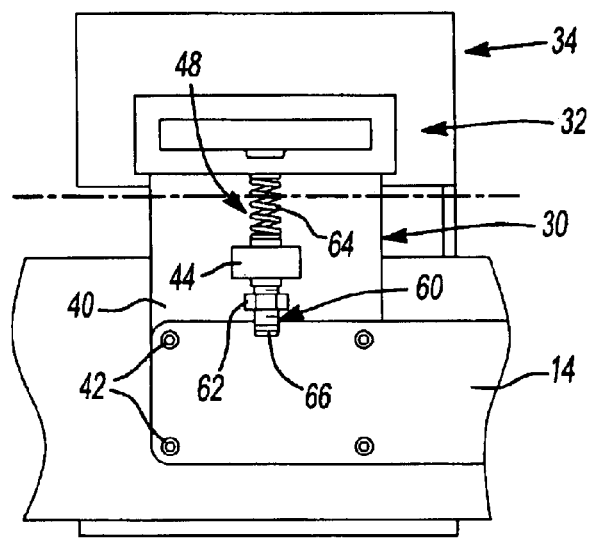
FIG. 4 is a partial top plan view of the cut guide and band saw.

With additional reference to FIGS. 3 and 4, the cut guide 10 is illustrated to include a mounting portion 30, a guide block portion 32 and a guide portion 34. The mounting portion 30 is illustrated to be coupled to the housing 12. More specifically, the mounting portion 30 is illustrated in the example provided to have a generally horizontally extending flange 40, the proximal end of which is fixedly but removably coupled to the handle 14 via a plurality of screws 42. Those skilled in the art will appreciate that various other mechanisms and means for coupling the cut guide 10 to the band saw 8 may be employed in the alternative and as such, the particular mounting means illustrated and discussed herein is not intended to be limiting in any respect. Preferably, the flange 40 is oriented generally perpendicular to the cutting portion 22a of the band saw blade 22, but this orientation is not essential.

Figure 5:
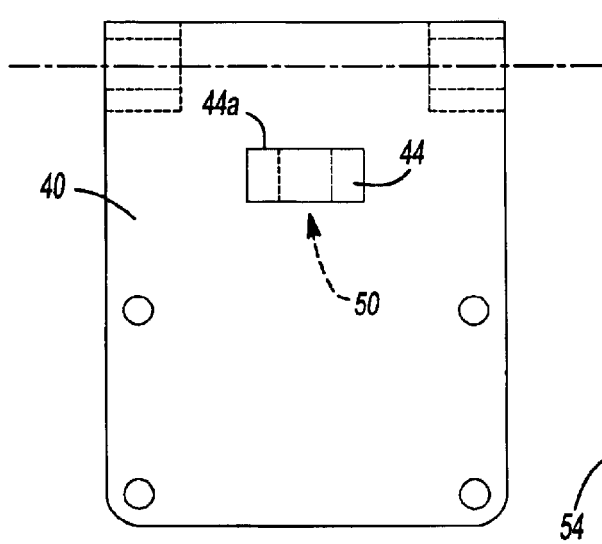
FIG. 5 is a top plan view of a portion of the cut guide illustrating the mounting portion in greater detail.
Figure 6:
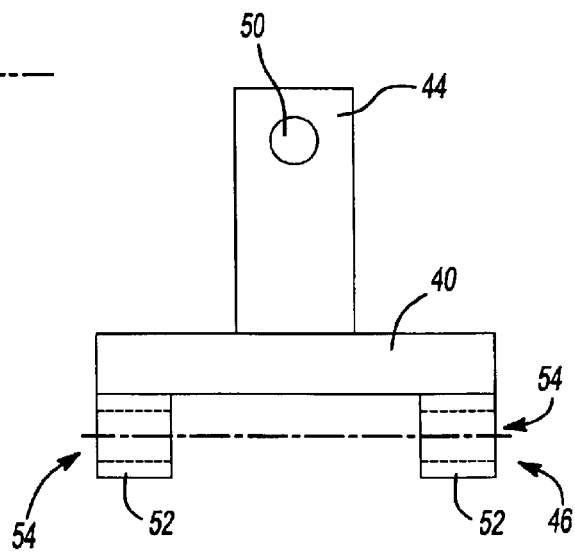
FIG. 6 is a left side elevation view of the mounting portion.

With specific reference to FIGS. 3, 5 and 6, the mounting portion 30 also includes an adjustment flange 44, a pivot block 46 and an adjustment mechanism 48. The adjustment flange 44 extends generally perpendicularly to the flange 40 and includes an adjustment aperture 50. The adjustment aperture 50 is illustrated to be round, but may also be slotted. The pivot block 46 includes a pair of lugs 52 that are fixedly coupled to the flange 40 proximate the anterior and posterior edges of the flange 40. A bore 54 is formed through the lugs 52 in an orientation that is generally parallel the cutting portion 22a of the band saw blade 22.

The adjustment mechanism 48 is illustrated to include a threaded pin 60, a hand knob 62 and a compression spring 64. The threaded pin 60 includes a threaded portion 66, which extends through the adjustment aperture 50 and threadably engages the hand knob 62, and a head portion (not specifically shown) that is engaged to the guide block portion 32. In the particular example provided, the threaded pin 60 is a conventional flat head machine screw so that the head portion has a generally frustoconical shape. The head portion is disposed in a countersunk hole 70 (FIG. 7) in the guide block portion 32 so as not to interfere with the operation of the guide portion 34. Those skilled in the art will appreciate that an anti-rotation means, such as a jam nut (not shown), a mating geometric feature (e.g., a square protrusion such as that which is formed on a carriage bolt) or threaded engagement of the threaded pin 60 to the guide block portion 32, may be employed to inhibit relative rotation between the threaded pin 60 and the guide block portion 32. The compression spring 64 is disposed between the adjustment flange 44 and the guide portion 34 and operably generates a force that biases the hand knob 62 against the adjustment flange 44. Those skilled in the art will appreciate that rotation of the hand knob 62 causes the threaded pin 60 to move through the adjustment aperture 50 such that the head portion of the threaded pin 60 is relatively closer or further axially from the distal face 44a of the adjustment flange 44.

Figure 7:
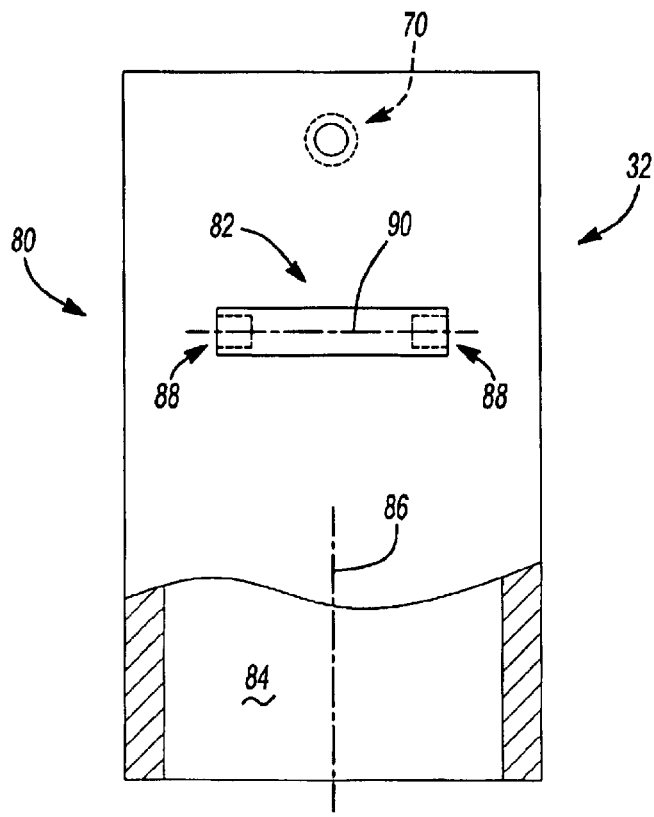
FIG. 7 is a left side elevation view of a portion of the cut guide illustrating the guide block portion in greater detail.

In FIGS. 2, 3 and 7, the guide block portion 32 is illustrated to include a guide block 80 and a pivot block 82. In the particular embodiment illustrated, the guide block 80 has a generally rectangular outer perimeter and a generally rectangular cavity 84 that extends along a generally vertical cutting stroke axis 86 through the guide block 80. The pivot block 82, which is illustrated to be a generally rectangular block having holes 88 formed in its opposite ends, is fixed to the guide block 80 in an orientation where the axis 90 of the holes 88 is generally perpendicular to the axis 86 of the cavity 84.

With additional reference to FIGS. 5 and 6, the guide block portion 32 is abutted against the mounting portion 30 such that the pivot block 82 is disposed between the lugs 52 of the pivot block 46. A pivot pin 94 is thereafter inserted through the bore 54 of each lug 52 and in an associated one of the holes 88 to pivotably couple the guide block portion 32 to the mounting portion 30. The pivot pins 94 are illustrated to be dowel pins that engage the bore 54 of each lug 52 in a slip-fit manner but engage the holes 88 in the pivot block 82 in a press-fit manner. Those skilled in the art will understand, however, that any means for pivotably or hingedly connecting the guide block portion 32 to the mounting portion 30 may alternatively be employed, including substituting conventional shoulder screws for the pivot pins 94 or using a conventional and commercially available hinge to pivotably couple the flange 40 to the guide block 80.

With the guide block portion 32 and the mounting portion 30 pivotably coupled to one another, the force generated by the compression spring 64 biases the guide block 80 in a clockwise direction (FIG. 3) about the axis 90. Accordingly, rotation of the hand knob 62 will lengthen or shorten the effective length of the threaded pin 60 (i.e., the distance between the adjustment flange 44 and the guide block 80) to rotate the guide block portion 32 clockwise or counter-clockwise, respectively, to adjust the axis 86 of the cavity 84 relative to the cutting portion 22a of the band saw blade 22.

In FIGS. 1, 2 and 8 through 10, the guide portion 34 is illustrated to include a guide bar 100 and an abutment structure 102. In the particular embodiment illustrated, the guide bar 100 is a rectangular bar that is sized to fit in the cavity 84 in a slip-fit manner. In this regard, the guide bar 100 is sized somewhat smaller than the cavity 84, which permits the guide bar 100 to travel freely in a generally vertical direction. However, the clearance between the guide bar 100 and the cavity 84 is preferably not sufficient to permit the guide bar 100 to move laterally or rotate within the cavity 84 to any significant degree. A stop member 104 is coupled to the guide bar 100 proximate the top edge of the guide bar 100 and prevents the guide bar 100 from falling completely through the cavity 84. The stop member 104, which is a screw that is threadably engaged to a hole in the guide bar 100 in the example provided, is preferably removably attached to the guide bar 100.

The abutment structure 102 is coupled to the bottom edge of the guide bar 100 and in the particular embodiment illustrated, is generally L-shaped in side view having a base portion 110 and a leg portion 112. The base portion 110 is oriented generally perpendicular to the guide bar 100 while the leg portion 112 is generally parallel the guide bar 100.

Portions of the base and leg portions 110 and 112 may be optionally cut out to reduce the weight of the cut guide 10, for example.

In operation, the band saw 8 is positioned relative to a workpiece 120 such that the both the base portion 110 and the leg portion 112 abut the workpiece 120. As the teeth of the cutting portion 22a of the band saw blade 22 are pointed rearwardly toward the leg portion 112, the band saw 8 is urged forwardly during the cutting operation so that contact is maintained between the leg portion 112 and the workpiece 120. Generally speaking, the weight of the band saw 8 and the cut guide 10 will urge the base portion 110 into contact with the upper surface of the workpiece 120 so that the abutment structure 102 accurately and repeatably positions the cut guide 10 (and the cutting portion 22a of the band saw blade 22) relative to the workpiece 120.

With the leg portion 112 and base portion 110 abutted against the workpiece 120, the cutting portion 22a may be passed through the workpiece 120 in a highly controlled manner. If the cut is not plumb to a desired degree, the operator need only rotate the hand knob to skew the cutting portion 22a of the band saw blade 22 in an appropriate direction relative to the longitudinal axis 120a of the workpiece 22. Those skilled in the art will appreciate that adjusted position of the cutting portion 22a relative to the axis 120a of the workpiece 22 will not necessarily be perpendicular. The force produced by the compression spring 64 ensures that a sufficient locking force is applied to the hand knob 62 and threaded portion 66 of the threaded pin 60 to prevent relative rotation therebetween that would alter the relationship between the axis 86 of the cavity 84 and the cutting portion 22a. As noted above, however, further adjustment of the axis 86 of the cavity 84 relative to the cutting portion 22a may be necessary will likely be necessary as the band saw blade 22 wears a symmetrically (i.e., dulls).

Figure 10:
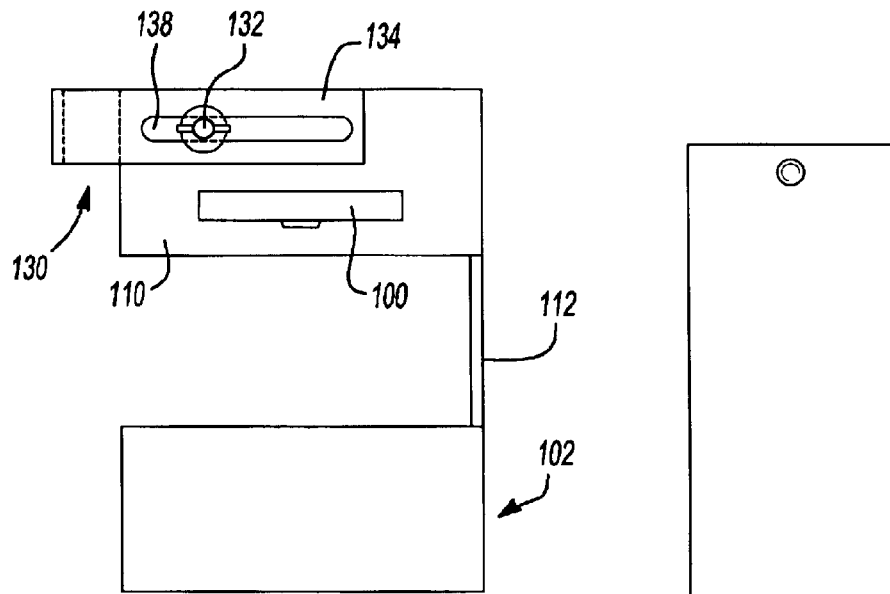
FIG. 10 is a top plan view of the guide portion.

In FIGS. 8 through 10, the guide portion 34 is illustrated to include an optional clamp structure 130. The clamp structure 130 is adjustably coupled to the abutment structure 102 so that the distance between the leg portion 112 and a front leg portion 136 can be adjusted. In the particular example provided, a threaded stud 132 is fixedly coupled to the base portion 110 and extends generally perpendicularly therefrom. The clamp structure 130 is generally L-shaped, having an adjustment leg 134 that overlies the base portion 110 and a front leg portion 136 that is generally perpendicular to the adjustment leg 134. A slotted aperture 138, which is sized to receive therethrough the threaded stud 132, is formed through the adjustment leg 134. A conventional flanged wing-nut 140 is employed to fixedly but adjustably and releasably couple the clamp structure 130 to the abutment structure 102. In operation, the clamp structure 130 permits the operator to position the cut guide 10 such that the leg portion 112 is positioned against the workpiece 120 in a more reliable manner prior to the commencement of cutting.

Figure 11:
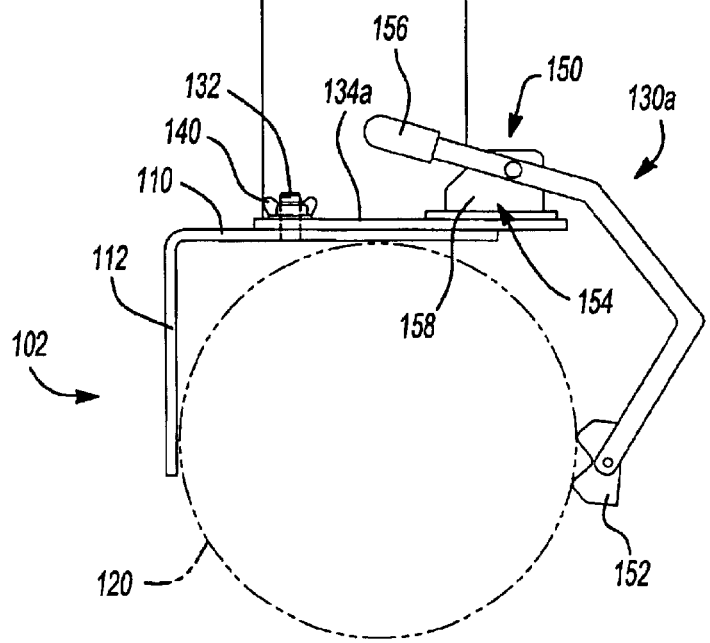
FIG. 11 is a right side elevation view of an alternately constructed guide portion.

In FIG. 11, an alternately constructed clamp structure 130a is illustrated. The clamp structure 130a includes an adjustment leg 134a which is similar to the adjustment leg 134 discussed above. However, a clamp mechanism 150, rather than a front leg portion 136 is coupled to the distal end of the adjustment leg 134a. The clamp mechanism 150 is illustrated to include a V-block detail 152 that is pivotally coupled to a conventional toggle clamp 154 of the type that is commercially available from various sources that provide tool and fixture building supplies, such as the Carr Lane Manufacturing Company of St. Louis, Mo. The toggle clamp 154, which is shown schematically and not in detail, is illustrated to include an arm 156 that is pivotally coupled to a flange base 158. In the particular example provided, rotation of the arm 156 toward the adjustment leg 134a causes the V-block detail 152 to pivot away from the workpiece 120, while rotation of the arm 156 in the opposite direction causes the V-block detail 152 to pivot into the workpiece 120. The adjustment leg 134a is preferably adjusted relative to the abutment structure 102 so that an over-center locking mechanism (not shown) maintains the V-block detail 152 in a condition engaged against the workpiece 120 when the arm 156 is rotated away from the adjustment leg 134a.

Figure 12:
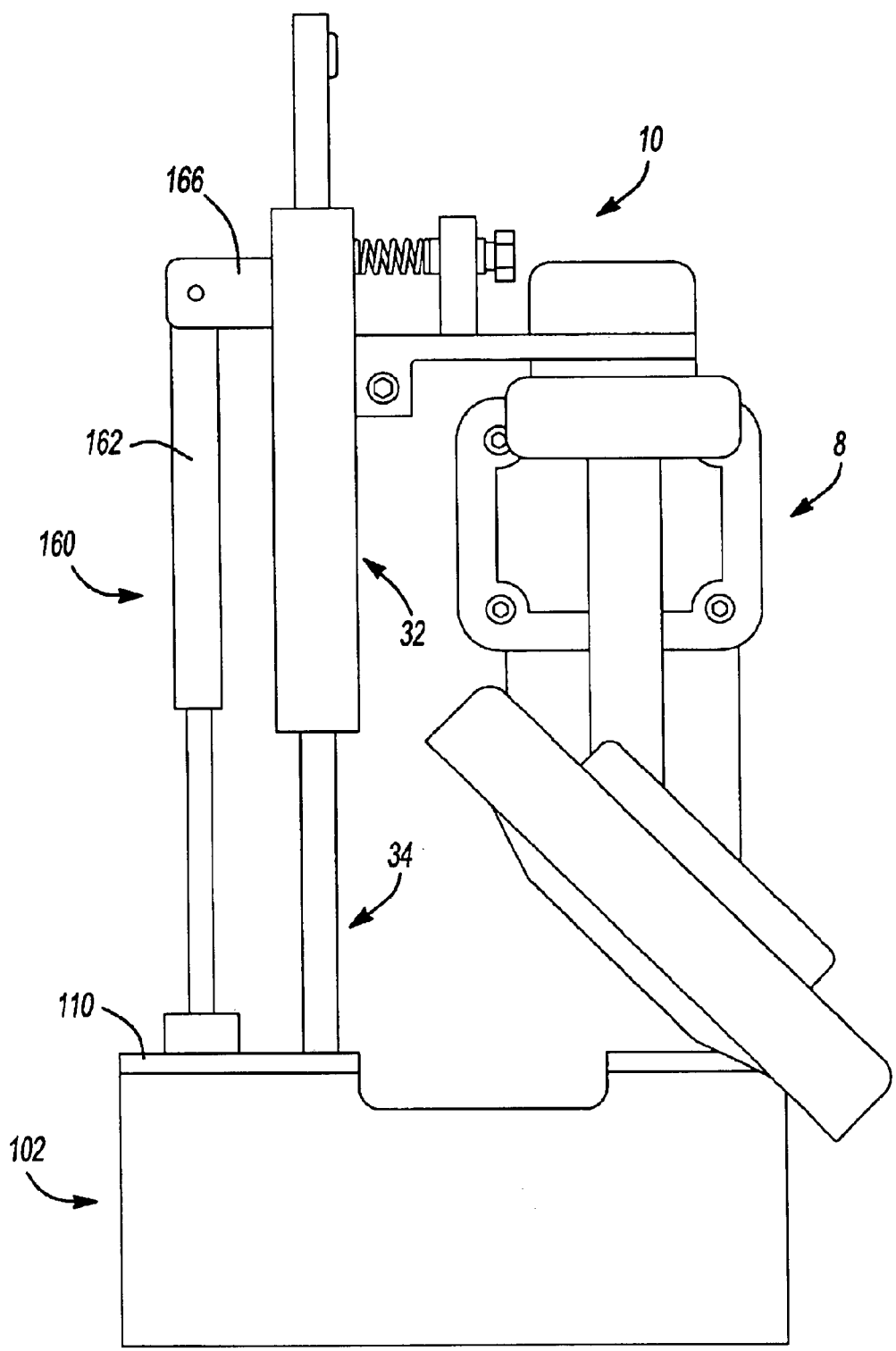
FIG. 12 is a front elevation view of an alternately constructed cut guide in operative association with a portable hand-held band saw.

A further modification to the cut guide 10 is illustrated in FIG. 12 wherein a return mechanism 160 is employed to bias the guide portion 34 downwardly into an extended position. The return mechanism 160 may include a conventional compression spring, but in the particular embodiment illustrated, includes a hydraulic lift assist 162 such as those that are conventionally employed in automotive applications to retain liftgates and hoods in a raised position. The hydraulic lift assist 162 is fixedly coupled to the base portion 110 of the abutment structure 102 and is pivotally coupled to a flange 166 that is fixed to the guide block portion 32. The resistive force supplied by the return mechanism 160 not only automatically lowers the guide portion 34 when the cut guide 10 is removed from a workpiece to ready the cut guide 10 for another cut, but also helps to ensure that the downwardly directed force exerted by the operator during a cutting operation is uniformly distributed over the length of the base portion 110 to thereby further ensure that the entirety of the base portion 110 is maintained in abutment with the workpiece during the cutting operation.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A cut guide for a portable hand-held saw, the saw having a blade with a cutting portion that is disposed along a generally vertical axis, the cut guide comprising:

a mounting portion that is configured to be coupled to the saw;

a guide block portion that defines a generally vertical cutting stroke axis, the guide block portion being pivotally coupled to the mounting portion such that the cutting stroke axis can be pivoted relative to the cutting portion of the blade;

a guide portion movably coupled to the guide block portion along the cutting stroke axis, the guide portion including an abutment structure with at least one feature for establishing an orientation of the cutting stroke axis relative to a longitudinal axis of a workpiece; and an adjustment mechanism for pivoting the guide block portion relative to the mounting portion to thereby adjust an angular relationship of the cutting stroke axis relative to the longitudinal axis of the workpiece.

2. The cut guide of claim 1, wherein the abutment structure includes a first wall that is disposed in a first plane and a second wall that is disposed in a second plane, the first and second planes intersecting one another.

3. The cut guide of claim 2, wherein the first and second planes are generally perpendicular to one another.

4. The cut guide of claim 2, wherein one of the first and second planes is disposed in a plane that is generally parallel to the cutting stroke axis.

5. The cut guide of claim 2, wherein the abutment structure includes a third wall that is disposed in a third plane, the third plane being generally parallel to one of the first and second planes and adjustably spaced apart therefrom.

6. The cut guide of claim 1, further comprising a clamp coupled to the guide portion, the clamp being adapted for clamping the guide portion to the workpiece.

7. The cut guide of claim 1, further comprising a return mechanism coupled to the guide portion and at least one of the mounting portion and the guide block portion, the return mechanism being configured to bias the guide portion away from the guide block portion.

8. The cut guide of claim 1, wherein the return mechanism includes at least one of a fluid lift assist and a spring.

9. The cut guide of claim 1, wherein the adjustment mechanism includes a threaded member that threadably engages another structure associated with one of the mounting portion and the guide block portion to control the angular relationship of the cutting stroke axis relative to the longitudinal axis of the workpiece.

10. The cut guide of claim 9, wherein one end of the threaded member is pivotally coupled to one of the mounting portion and the guide block portion.

11. The cut guide of claim 10, wherein the other one of the mounting portion and the guide block portion includes an adjustment flange and an end of the threaded member opposite the one end extends through the adjustment flange.

12. The cut guide of claim 11, wherein the another structure is threadably engaged to the threaded member on a side of the adjustment flange opposite the one of the mounting portion and the guide block portion.

13. The cut guide of claim 12, wherein the adjustment mechanism further comprises a spring for biasing the guide block portion away from the mounting portion.

14. The cut guide of claim 13, wherein the spring is carried by the threaded member.

15. The cut guide of claim 14, wherein the spring is disposed on the threaded member between the adjustment flange and the other one of the mounting portion and the guide block portion.

16. A portable hand-held saw comprising:
a blade having a cutting portion that is disposed along an axis;
a saw body having a housing and a motor that is disposed in the housing, the motor being configured to move the blade; and
a cut guide coupled to the housing, the cut guide including a mounting portion, a guide block portion and a guide portion, the mounting portion being configured to couple the cut guide to the housing of the saw body, the guide block portion defining a generally vertical cutting stroke axis, the guide block portion being pivotally coupled to the mounting portion such that the cutting stroke axis can be pivoted relative to the cutting portion of the blade to thereby permit an angular relationship of the cutting stroke axis relative to the longitudinal axis of the workpiece to be adjusted, the guide portion being movably coupled to the guide block portion along the cutting stroke axis, the guide portion including an abutment structure with at least one feature for establishing an orientation of the cutting stroke axis relative to a longitudinal axis of a workpiece.

17. The saw of claim 16, wherein the saw body is a band saw.

18. The saw of claim 16, wherein the blade is an endless loop.

19. The saw of claim 16, wherein the cut guide further comprises an adjustment mechanism for selectively controlling an amount by which the guide block portion is pivoted relative to the mounting portion.

20. The saw of claim 19, wherein the adjustment mechanism includes a threaded member that threadably engages another structure associated with one of the mounting portion and the guide block portion to control the angular relationship of the cutting stroke axis relative to the longitudinal axis of the workpiece.

* * * * *